United States Patent
Skvortsov et al.

(10) Patent No.: US 12,395,317 B2
(45) Date of Patent: Aug. 19, 2025

(54) CRYPTOGRAPHIC COMPUTATION TECHNIQUES FOR MULTI-PARTY REACH AND FREQUENCY

(71) Applicant: Google LLC, Mountain View, CA (US)

(72) Inventors: Evgeny Skvortsov, Kirkland, WA (US); Mariana Petrova Raykova, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/013,074

(22) PCT Filed: Jun. 14, 2022

(86) PCT No.: PCT/US2022/033427
§ 371 (c)(1),
(2) Date: Dec. 27, 2022

(87) PCT Pub. No.: WO2023/244216
PCT Pub. Date: Dec. 21, 2023

(65) Prior Publication Data
US 2024/0243900 A1    Jul. 18, 2024

(51) Int. Cl.
*G06F 21/00*     (2013.01)
*H04L 9/06*      (2006.01)

(52) U.S. Cl.
CPC ..................... *H04L 9/06* (2013.01)

(58) Field of Classification Search
CPC ...... H04L 9/06; H04L 9/3221; H04L 2209/46
See application file for complete search history.

(56) References Cited

U.S. PATENT DOCUMENTS 10,812,252 B2 * 10/2020 Laine ............... G06F 9/30014
2016/0105277 A1 * 4/2016 Isshiki ............... H04L 9/3231
380/28

(Continued)

FOREIGN PATENT DOCUMENTS

| CN | 110719159 | 1/2020 |
| EP | 3477527 | 5/2019 |

OTHER PUBLICATIONS

Fillinger et al., "Reconstructing the Cryptanalytic Attack behind the Flame Malware", Sep. 30, 2013, retrieved from the internet on Feb. 28, 2023, 97 pages.

(Continued)

*Primary Examiner* — Michael M Lee
(74) *Attorney, Agent, or Firm* — DORITY & MANNING, P.A.

(57) ABSTRACT

Systems and methods for detecting a collision when combining a first encrypted data structure and a second encrypted data structure are disclosed. The system can receive the first encrypted data structure representative of a first plurality of registers. Each register in the first plurality of registers can have an encrypted fingerprint value, and an encrypted register identifier value. The system can receive the second encrypted data structure representative of a second plurality of registers. The system can calculate a first sum associated with a first register of the first plurality of registers based on the fingerprint value of the first register. The system can calculate a second sum associated with a second register of the second plurality of registers. The system can determine a validity bit associated with the collision based on a comparison of the first sum and the second sum.

19 Claims, 7 Drawing Sheets

(56) References Cited

U.S. PATENT DOCUMENTS

| | | | |
|---|---|---|---|
| 2019/0097787 A1* | 3/2019 | Schneider | H04L 9/008 |
| 2020/0084191 A1* | 3/2020 | Nicholls | H04L 9/3236 |
| 2020/0267144 A1* | 8/2020 | Wagner | G06Q 20/1085 |
| 2021/0174441 A1* | 6/2021 | Asharov | G06Q 20/203 |

OTHER PUBLICATIONS

International Search Report and Written Opinion for PCT/US2022/033427, mailed Feb. 8, 2023, 13 pages.
International Preliminary Report on Patentability for Application No. PCT/US2022/033427, mailed Dec. 26, 2024, 7 pages.

* cited by examiner

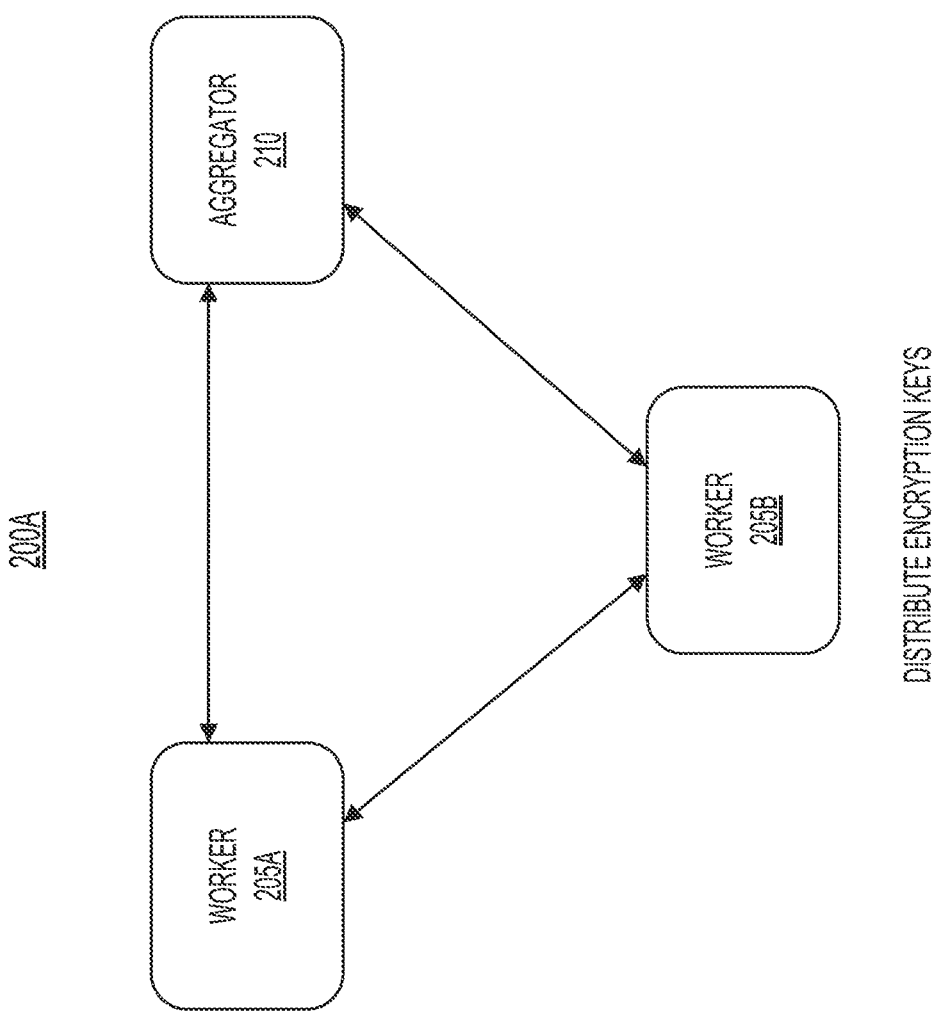

CRYPTOGRAPHIC COMPUTATION TECHNIQUES FOR MULTI-PARTY REACH AND FREQUENCY

PRIORITY CLAIM

This application is based upon and claims the right of priority under 35 U.S.C. § 371 to International Application No. PCT/US2022/033427, filed on Jun. 14, 2022. International Application No. PCT/US2022/033427 is hereby incorporated by reference herein in its entirety.

FIELD

The present disclosure relates generally to systems and methods for computing reach and frequency across multiple data providers. More particularly, the present disclosure relates zero-knowledge cryptographic computation of reach and frequency histograms in a multi-party computation (MPC) protocol.

BACKGROUND

In many instances, computing and data analysis systems may determine the intersection, or union, of large sets of data as part of analysis or processing of the data. Computing the union, intersection, or frequency of large sets of data distributed across multiple sources typically involves sharing information about the large sets of data between the multiple sources. Information from each source can include private or protected information and sharing such information may negatively impact privacy and security.

SUMMARY

Aspects and advantages of embodiments of the present disclosure will be set forth in part in the following description, or can be learned from the description, or can be learned through practice of the embodiments.

One example aspect of the present disclosure is directed to a method for detecting a collision when combining a first encrypted data structure and a second encrypted data structure into a combined encrypted data structure. The method includes receiving, by a data processing system comprising one or more processors and a memory, the first encrypted data structure representative of a first plurality of registers. Each register in the first plurality of registers can have an encrypted fingerprint value, and an encrypted register identifier value. Additionally, the method includes receiving the second encrypted data structure representative of a second plurality of registers. Each register in the second plurality of registers can have an encrypted fingerprint value, and an encrypted register identifier value. Moreover, the method includes calculating a first sum associated with a first register of the first plurality of registers based on the encrypted fingerprint value of the first register. Furthermore, the method includes calculating a second sum associated with a second register of the second plurality of registers based on the encrypted fingerprint value of the second register. Subsequently, the method includes determining a validity bit associated with the collision based on a comparison of the first sum and the second sum.

Another example aspect of the present disclosure is directed to systems for detecting a collision when combining a first encrypted data structure and a second encrypted data structure into a combined encrypted data structure. The system includes a data processing system comprising one or more processors and a memory. The data processing system can be configured to receive the first encrypted data structure representative of a first plurality of registers. Each register in the first plurality of registers can have an encrypted count value, an encrypted fingerprint value, and an encrypted register identifier value. Additionally, the data processing system can be configured to receive the second encrypted data structure representative of a second plurality of registers. Each register in the second plurality of registers can have an encrypted count value, an encrypted fingerprint value, and an encrypted register identifier value. Moreover, the data processing system can be configured to calculate a first sum associated with a first register of the first plurality of registers based on the encrypted count value of the first register and the encrypted fingerprint value of the first register. Furthermore, the data processing system can be configured to calculate a second sum associated with a second register of the second plurality of registers based on the encrypted count value of the second register and the encrypted fingerprint value of the second register. Subsequently, the data processing system can be configured to determine a validity bit associated with the collision based on a comparison of the first sum and the second sum.

A further example of the present disclosure is directed to one or more non-transitory computer-readable media. The non-transitory computer-readable media can comprise instructions that when executed by one or more computing devices cause the computing device(s) to perform operations. The operations can include receiving a first encrypted data structure representative of a first plurality of registers. Each register in the first plurality of registers can have an encrypted count value, an encrypted fingerprint value, and an encrypted register identifier value. Additionally, the operations can include receiving a second encrypted data structure representative of a second plurality of registers. Each register in the second plurality of registers can have an encrypted count value, an encrypted fingerprint value, and an encrypted register identifier value. Moreover, the operations can include calculating a first sum associated with a first register of the first plurality of registers based on the encrypted count value of the first register and the encrypted fingerprint value of the first register. Furthermore, the operations can include calculating a second sum associated with a second register of the second plurality of registers based on the encrypted count value of the second register and the encrypted fingerprint value of the second register. Subsequently, the operations can include determining a validity bit based on a comparison of the first sum and the second sum, the validity bit indicating whether a collision occurred when combining the first encrypted data structure and the second encrypted data structure.

In some implementations, the first register can include an encrypted first count value and the second register includes an encrypted second count value. Additionally, the first sum can be further calculated based on the encrypted first count value. Moreover, the second sum can be further calculated based on the encrypted second count value.

In some implementations, the system can generate a third register in the combined encrypted data structure by concatenating the first register and the second register when the validity bit is set as true. Additionally, the system can calculate a reach value associated with the third register based on a summation of the encrypted first count value and the encrypted second count value.

In some implementations, the first encrypted data structure can be transmitted using a dense protocol. The dense protocol enables the transmission of empty registers. Therefore, the encrypted fingerprint value prior to being encrypted is indicative of a zero value for one or more registers in the first plurality of registers.

In some implementations, the data processing system can generate the combined encrypted data structure by concatenating the first encrypted data structure with the second encrypted data structure. The combined encrypted data structure can be representative of a third plurality of registers. A third register in the third plurality of registers can have an encrypted count value, an encrypted fingerprint value, an encrypted register identifier value, and the validity bit. Additionally, the validity bit can be encrypted by the data processing system prior to being transmitted to a worker computing device.

In some implementations, the data processing system can transmit the combined encrypted data structure to a worker computing device. Each register in the third plurality of registers can have an encrypted count value, an encrypted fingerprint value, an encrypted register identifier value, and an encrypted validity bit.

In some implementations, the validity bit can be set as true when the encrypted fingerprint value of the first register matches the encrypted fingerprint value of the second register. Additionally, the validity bit can be set as true when the encrypted fingerprint value of the first register or the encrypted fingerprint value of the second register when decrypted is equal zero. Alternatively, the validity bit can be set as false when the encrypted fingerprint value of the first register does not match the encrypted fingerprint value of the second register, and neither the encrypted fingerprint value of the first register nor the encrypted fingerprint value of the second register is indicative of a zero value when decrypted.

In some implementations, the encrypted register identifier value of the first register is equal to the encrypted register identifier value of the second register.

In some implementations, the first encrypted data structure has an additively homomorphic encryption. Additionally, the data processing system can calculate the first sum without having to decrypt the encrypted count value of the first register and the encrypted fingerprint value of the first register.

In some implementations, the first set of identifiers can be received from a first publishing computing device. Additionally, the second set of identifiers can be received from a second publishing computing device.

In some implementations, the encrypted count value of the first register corresponds to a number of advertisement views associated with the encrypted fingerprint value.

In some implementations, when calculating the first sum associated with the first register, the data processing system can generate a plurality of vectors based on the encrypted count value and the encrypted fingerprint value associated with the first plurality of registers. Additionally, the first sum can be calculated by summing each vector in the plurality of vectors. In some implementations, the plurality of vectors can be a five-dimensional vector.

In some implementations, the first register can be a four-tuple array that is encrypted, and the plurality of vectors can be a four-dimensional vector. An example embodiment of the four-tuple array is described in the Balancing Uniqueness Detector section of the disclosure.

In some implementations, a first vector in the plurality of vectors can be generated by adding together the encrypted count values in the first plurality of registers.

In some implementations, the plurality of vectors can be further based on a first random number and a second random number.

In some implementations, a second vector in the plurality of vectors can be generated by multiplying the encrypted fingerprint values in the first plurality of registers with the first random number.

In some implementations, a third vector in the plurality of vectors is generated by multiplying the encrypted fingerprint values in the first plurality of registers with the second random number.

In some implementations, the data processing system can be further configured to generate the combined encrypted data structure by concatenating the first encrypted data structure with the second encrypted data structure, the combined encrypted data structure representative of a third plurality of registers. A third register in the third plurality of registers can have an encrypted count value, an encrypted fingerprint value, an encrypted register identifier value, and the validity bit. Additionally, the data processing system can transmit the combined encrypted data structure to a worker computing device. Each register in the third plurality of registers can have an encrypted count value, an encrypted fingerprint value, an encrypted register identifier value, and an encrypted validity bit.

In some implementations, the validity bit is set as true when the encrypted fingerprint value of the first register matches the encrypted fingerprint value of the second register, the encrypted fingerprint value of the first register when decrypted is indicative of a zero value or the encrypted fingerprint value of the second register when decrypted is equal zero. Alternatively, the validity bit can be set as false when the encrypted fingerprint value of the first register does not match the encrypted fingerprint value of the second register, and neither the encrypted fingerprint value of the first register nor the encrypted fingerprint value of the second register is indicative of a zero value when decrypted.

These and other features, and characteristics of the present technology, as well as the methods of operation and functions of the related elements of structure, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a". "an", and "the" include plural references unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. These and other aspects and features of the present technical solution will become apparent to those ordinarily skilled in the art upon review of the following description in conjunction with the accompanying figures, wherein:

FIG. 2A depicts a block diagram of an example system for the generation and distribution of encryption keys, in accordance with one or more implementations;

DETAILED DESCRIPTION

Figure 1:
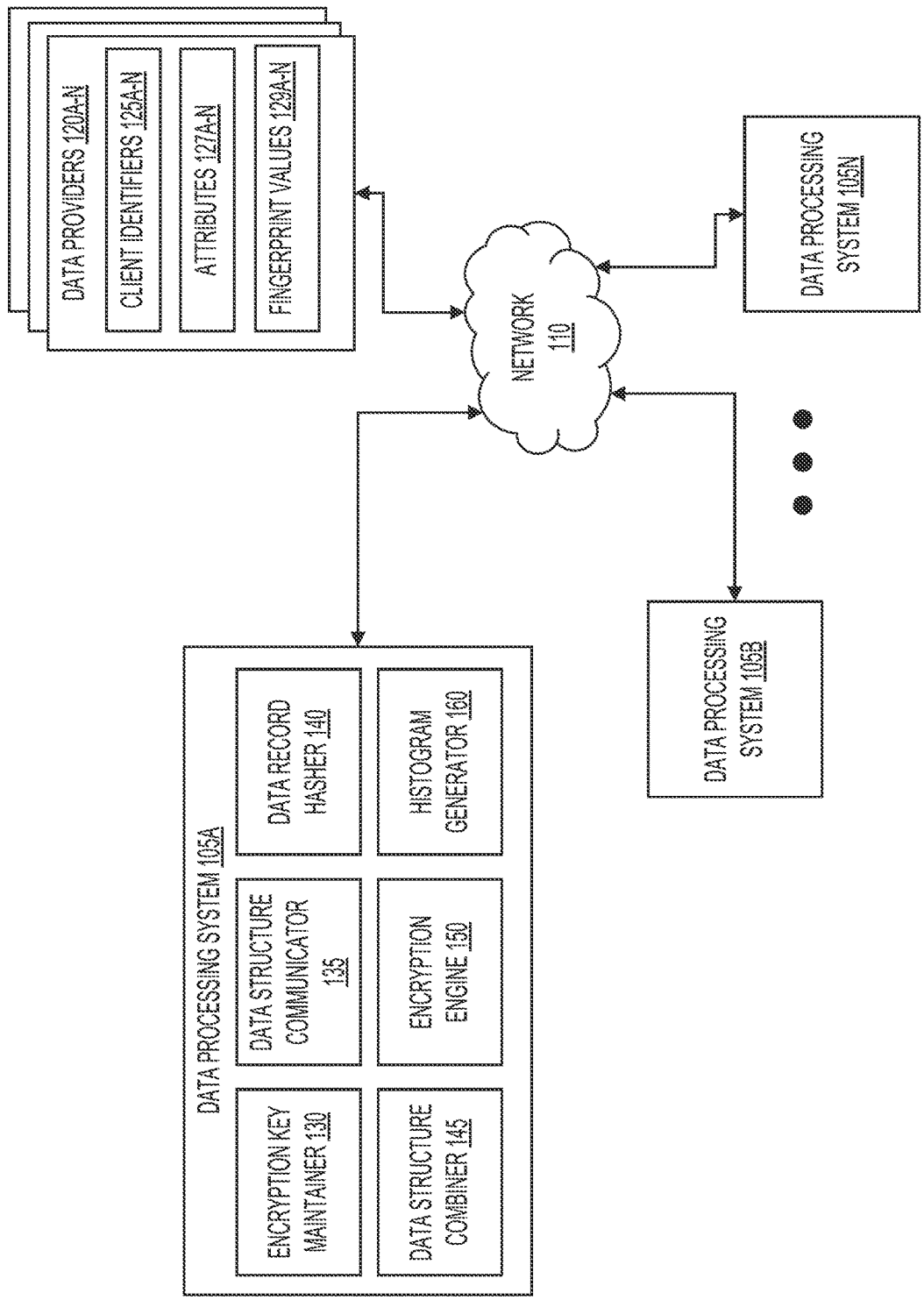
FIG. 1 illustrates a block diagram of an example system for zero-knowledge cryptographic computation of reach and frequency in a distributed environment, in accordance with one or more implementations.

Below are detailed descriptions of various concepts related to, and implementations of, methods, apparatuses, and systems of zero-knowledge cryptographic computation of the frequency and reach of a multiset in a distributed environment. The various concepts introduced above and discussed in greater detail below may be implemented in any of numerous ways, as the described concepts are not limited to any particular manner of implementation. Examples of specific implementations and applications are provided primarily for illustrative purposes.

Described herein below are various computing devices and configurations for performing a secure, differentially private multi-party computation (MPC) protocol for reach or frequency estimation. Although the reach or frequency can be used to estimate certain parameters of client devices (e.g., online activities, client device type, interaction events, other measurements), it should be understood that the systems and methods described herein can apply these techniques to any multiset.

The term "sketch," as used herein, shall refer to one or more data structures containing one or more data elements, data records, variables, counter registers, floating point values, strings, index values, memory pointer values, or any combination thereof as described herein. The term "sketch" and "data structure" may sometimes be used interchangeably.

Often, user devices can interact or perform online activities across different content publishers. These content publishers would often like to share online activity measurements from the client devices that interact with the information resources that the publishers provide. However, a lack of security inherent in some networked systems may cause client device information to be provided to an undesired party. Thus, publishers can utilize MPC protocols, having different layers of encryption, to estimate characteristics or parameters of the client devices across publishers. For example, the reach, or number of unique client devices that access a content item one or more times, can be computed using a MPC protocol. Frequency, or number of times a client device interacts with a content item, where k is the frequency value, can be computed in a similar manner. Techniques described herein can enable the MPC protocols to be differentially private in order to safeguard the client device data when computing reach or frequency. Differential privacy (DP) enables sharing information about a dataset by describing the patterns of groups within the dataset while withholding information about individuals in the dataset. DP can be a constraint on the algorithms used to publish aggregate information about a statistical database which limits the disclosure of private information of records whose information is in the database.

Data providers can be associated with sets of client devices, for example by maintaining a client identifier that is associated with the respective client device. Each client identifier can include attribute information that describes the association between each identifier server and client device. Attribute information can include information about the relationship between the client device and the identifier server (e.g., web-browsing history, interaction data, association time, network analysis data), and can include protected or otherwise private information received from the respective client device. Different identifier servers may maintain different attribute data and different client identifiers that correspond to the same respective client devices. Typically, to determine whether there is duplicate attribute data between each identifier server, the identifier servers may share the attribute data, which can include protected or private information, to a centralized server to de-duplicate any client attribute information.

However, the transmission of all client attribute data poses issues to scalability. As the number of client identifier servers increases, the amount of client device attribute data transmitted via the network typically increases as well. Because the attribute data can be detailed and relatively large for each client device, transmitting such information at scale can exhaust network bandwidth and computational resources. Further, it would be beneficial for a system to not only compute a total number of user identifiers, but also compute the number of client devices that satisfy a particular attribute data criteria, such as the frequency of a particular attribute, without transmitting protected or private attribute information over the network.

To address the foregoing issues, aspects of systems and methods of this technical solution can utilize data sketches to determine a common number of client devices between large numbers of data providers. Each data provider can generate a data sketch that represents their associated set of client device identifiers and attribute data. Estimating information about frequency of client device attributes can be useful to determine macroscopic data trends between client devices and data providers, for example to make decisions about network bandwidth routing and computing resource allocation.

To maintain DP of the data sketch (e.g., data structure) for each data provider, the system can construct histograms of the reach and frequency, thereby abstracting the specific user and/or device information (e.g., identifiers, attributes). To create the histograms, each data provider can encrypt its data sketch using a private key known only to the respective data provider and send the encrypted data sketch to a known worker computing device. The worker computing devices can combine all of the data providers' encrypted data sketch into a single combined encrypted data sketch. The combined data sketch is still encrypted with the private keys of each identifier server. The combined data sketch is then passed in parallel to each worker computing device, which can decrypt the combined filter using a shared key, such that when the histogram is created it will be differentially private. By processing (e.g., merging) the data sketch in parallel, the processing speed is improved, which enables quicker calculations of the reach and frequency. Therefore, the technical implementation of the techniques of the present disclosure enables more efficient processing of data to be achieved. The histogram can be used to estimate the total number of unique client devices across all the data providers, along with the corresponding frequency of desired attribute data.

The systems and methods of this technical solution can describe an industry wide effort to measure cross-media reach and attribution across multiple identifier servers (e.g., publishers, providers) in a secure and privacy preserving manner. Hundreds or even thousands of data providers (e.g., identifier servers) can participate in this system. The algorithms detailed herein below for computing the intersections, unions, and attribute frequencies addresses both the scale of the problem and its stringent privacy requirements through the use of data sketch structures (e.g., bloom filters) for frequency and reach estimations. Since the number of computational devices and the number of communications which the techniques of the present disclosure may be applied to can be very large, the improvements to the efficiency of processing and the security of user data enabled by the techniques of the present disclosure can be particularly significant. Finally, it is important that such systems and methods of aspects of this present solution can be performed, executed, or otherwise operated by different entities without concern that any set of entities would breach the private or protected information of the other parties involved.

The reach of a particular set of attributes can be defined as the number of client devices that have been exposed to or otherwise reflect the respective attribute. Frequency can be defined as the number of times that a client device has been associated with a particular attribute.

The systems and methods of the present disclosure solve the foregoing issues by providing an improved data encryption technique, an improved MPC protocol, and an improved collision detection technique for reach and frequency estimation, according to illustrative implementations. Therefore, the techniques of the present disclosure are directed to improved encryption of electronic communications transmitted between different computational devices. This can improve the security of data in distributed systems. The techniques described herein may provide a secure and completely differentially private protocol for reach and frequency estimation for multisets of data. Therefore, the reach and frequency of online activities measured for client devices can be computed in a distributed fashion without risk to client device data, which is an improvement to the security of reach estimation and MPC systems.

Techniques described herein disclose zero-knowledge computing of reach and frequency across multiple data providers and delivering it to the advertiser. Reach and frequency histogram can be important characteristics of an advertising campaign. Reach can refer to the number of individuals that a marketing message has reached. Frequency can refer to the number of times that an individual has been exposed to the marketing message.

Techniques described herein can determine advertisement relevance and measurement in a privacy sandbox implementation. An example of a privacy sandbox implementation includes a web browser without third-party cookies. The advertisement relevance and measurement can be based on estimation of differentially private frequency histograms of advertising campaigns running across multiple publishers. The techniques described herein can enable privacy-preserving accumulation of user data for advertising analytics.

Differentially private estimations can be part of differential privacy (DP) systems that enable sharing information about a dataset by describing the patterns of groups within the dataset while withholding information about individuals in the dataset. Accordingly, to preserve the privacy of the users information about user reach and frequency at a first publisher, the information should not be revealed to another publisher or worker computing devices performing computations to compute the reach and frequency histograms.

Accordingly, aspects of this technical solution can provide increased security and privacy of data and data counting systems through the use of encrypted probabilistic data structures and a homomorphic encryption (e.g., additively homomorphic encryption) scheme. In many implementations, probabilistic data structures, such as bloom filters, may be generated to determine reach and frequency of device identifiers and attributes in a networking environment. A set of data records (e.g., device identifiers, user identifiers) associated with devices or users in a network may be maintained, and a probabilistic data structure may be generated comprising values that can correspond to counter registers. Hash functions can be used to update the data structures that can be identified, and data records may be hashed to extract index values, count values, frequency values, fingerprints, or other such identifiers to one or more positions in the probabilistic data structure. An aggregated public key comprising a public key may be obtained, and the data structure can be encrypted using the aggregated shared key to generate an encrypted data structure, with the encrypted data structure transmitted to a networked worker computing device.

By using a homomorphic encryption scheme, aspects of this technical solution can decrease the amount of data transmitted over the network, which is a significant improvement over other attribute data counting and comparison systems. Therefore, the techniques of the present disclosure can enable more efficient use to be made of limited bandwidth. Further, by using an estimated histogram, this technical solution can provide accurate estimations of client identifier attribute data frequencies without transmitting and protected or private information via the network. This not only protects identifier servers from exposing the number or attributes of their associated devices, but also protects client devices from exposing their protected or private information, which is a significant improvement to the security of networking systems.

These systems and methods can transmit the encrypted data structure (e.g., probabilistic data structure) to the worker computing devices, which can be orders of magnitude smaller than the data records used to generate the data structure and would otherwise be sent to one or more worker computing devices. This can decrease the amount of data transmitted over the network, and the amount of data processed by each worker computing device, which is a significant improvement over other multiparty comparison and computation systems. Additionally, by using a dense protocol scheme, the techniques described herein reduce the number of processing steps and the amount of processing because the data structure does not need to be shuffled. In contrast, conventional merging and estimation techniques utilize a sparse protocol scheme, which requires the non-empty registers to be shuffled prior to being transmitted to a worker computing device. Further, by using an estimated histogram, aspects of this technical solution can provide accurate estimations of client identifier attribute data frequencies without transmitting protected or private information via the network. This not only protects identifier servers from exposing the number or attributes of their associated devices, but also protects client devices from exposing their protected or private information, which is a significant improvement to the security and privacy of networking systems.

One of the advantages of the techniques described herein is to enable a parallelizable deduplication process that can merge records across systems (e.g., worker computing devices) without leaking data (e.g., whether a register is empty or active). The parallelizable deduplication process enables the system to transmit the encrypted data structure (e.g., probabilistic data structure) to the worker computing devices, which can be orders of magnitude smaller than the data records used to generate the data structure and would otherwise be sent to one or more worker computing devices. By performing the deduplication process in parallel, it reduces the computer processing time, which enables the reach and frequency estimates to be calculated faster than conventional methods. Therefore, the techniques of the present disclosure are adapted to provide more efficient implementation of these techniques on the underlying computational architecture. For example, novel collision detection techniques described can enable the deduplication process to be performed in parallel. The collision detection techniques include a validity bit that can indicate whether a collision has occurred during a merging operation. When a collision has occurred, the colliding registers can be removed in the deduplication process. The collision detection techniques utilize a novel approach to scale fingerprints by a first set of random numbers to form first products and by a second set of random numbers to form second products. Due to the randomness of the numbers, if the fingerprints are equal, the mean of the first products should equal the mean of the second products. Subsequently, the validity bit can be set as true when the fingerprints are equal. By enabling a parallelizable deduplication process, the system can merge records across machines without leaking data about zero-valued entries.

Another advantage of the techniques described herein is to allow for dense computation of zero and nonzero values directly (e.g., during the merging of empty and active registers), without the need for the sequential shuffling. In conventional methods, the data sketches could only be processed (e.g., merged) using a sparse protocol. In the sparse protocol, the system can process only active registers, so the empty registers need to be removed prior to processing. As a result, in the sparse protocol, the system first needs to shuffle sparse datasets around sequentially in order to maintain alignment of the nonzero registers. With the techniques described herein, the processing (e.g., merging) of the data sketches can be performed using a dense protocol. In the dense protocol, the system can process both the active and empty registers. As a result, by being able to utilize the dense protocol, the system can perform parallelized implementations of the merging and deduplication operations. The parallelized implementations reduce processing time for estimating the reach and frequency. This can provide more computationally efficient processing of data and more computationally efficient extraction of data from data structures.

As previously mentioned, conventional techniques for estimating reach and frequency utilize a sparse protocol when merging multiple data structures and for estimating the unique reach across multiple parties. In the sparse protocol, only the non-zero registers are transmitted to a worker computing device for a merge (e.g., join, union, combine) operation. However, by not sending the empty registers (e.g., registers with a fingerprint value that is indicative of a zero value), there is partial leakage of data because the worker computing device can determine the number of non-empty registers and the number of empty registers. The sparse protocol is used in conventional techniques partly because the merging of large sets of data distributed across multiple sources requires the merging of two non-zero registers. To illustrate, a conventional collision detection technique can detect a collision during the merging operation if the two registers have different values. Therefore, if one of the registers being merged is empty (e.g., fingerprint value is zero), then the conventional collision detection technique would incorrectly detect a collision because the fingerprint values of the two merging registers do not match given that one of the merging registers is empty. This is a false positive for a collision because there is no collision when one of the merging registers is empty, and the new register that is generated by merging (e.g., concatenating) the two merging registers can take on the value of the non-empty register. Subsequently, once the worker computer devices perform the merge operation, the data processing system can determine the total reach and frequency of a media campaign by analyzing the newly generated registers.

In some implementations, a collision can occur, and can be detected by the techniques described herein, when two non-empty registers have different values.

The techniques described herein enable the merging of multiple data structures that include empty registers. As a result, there is no leakage of data to the worker computing device because the worker computing device cannot determine the number of non-empty registers and the number of empty registers. In some implementations, the MPC protocol enables the system to perform a merging of sketches that include empty registers. The sketches can correspond to the inputs of different publishing computing devices.

In some implementations, the first phase of the process can be to detect collisions when merging a first encrypted data structure and a second encrypted data structure into a merged encrypted data structure. For example, a distributed point function (DPF) technique can be an example of a collision detection technique to determine whether there were collisions during the merging. In the first phase of the process, the merging operation can utilize the DPF technique to compare the fingerprint values for each register coming from the different publishing computing devices. For example, the DPF technique can sum up all of the fingerprint values and count values of each register in the first sketch and second sketch to determine whether a collision occurred in a combined register that is generated by merging two inputted registers from the first sketch and the sketch. A validity bit will be set as true when there is no collision in a combined register, and the validity bit will be set as false when there is a collision in a combined register. In some implementations, the DPF technique can be utilized by the system for identifying, by using a validity bit, registers of a sketch (e.g., encrypted data structures) to which more than one item were mapped and/or have a collision. The DPF technique is further described later in the disclosure.

Subsequently, in a second phase of the process, the system or final customer (e.g., advertiser computing system) can determine an estimation of the reach and an estimation of the frequency by decrypting the sketch. Additionally, in some embodiments when the worker computing device is unaware of the true value of the encrypted validity bit, the system or final customer can ignore the registers having a validity bit set as false when estimating the reach and frequency. For example, once it is determined that there was no collision based on a validity bit, then the combined encrypted data structure can be evaluated to compute the reach and frequency.

In some instances, the validity bit for a combined register is set as true when the encrypted fingerprint value of the first register matches the encrypted fingerprint value of the second register, the encrypted fingerprint value of the first register when decrypted is indicative of a zero value or the encrypted fingerprint value of the second register when decrypted is equal zero. Alternatively, the validity bit can be set as false for a combined register when the encrypted fingerprint value of the first register does not match the encrypted fingerprint value of the second register, and neither the encrypted fingerprint value of the first register nor the encrypted fingerprint value of the second register is indicative of a zero value when decrypted.

In some implementations, in order to merge empty registers, the system utilizes a novel encryption approach that hides all of the partial information from the worker computing device by only exposing the final output (e.g., validity bit). In some examples, the worker computing device may not know the final output because the validity bit may be encrypted, and therefore the process can be organized such that the worker computing devices get zero knowledge and differentially private results are delivered only to the final consumer (e.g., advertiser).

One of the benefits of the techniques described herein is to detect collisions in the sketches that are representing the reach and frequency. In some instances, each of the input providers (e.g., publishing computing systems) can represent input in the form of a sketch that has a particular form. For example, the sketch can contain a plurality of registers. Each register in the plurality of registers can include an index value of the register, a fingerprint value, and a validity bit. The system can merge the sketches provided by the different input providers, and during the merging, each register can combine the corresponding values that are coming from the different parties. Additionally, the system detects whether the fingerprints that are associated with these registers in the inputs of the different parties are the same or different. A collision detection functionality between the different multi-parties can be performed in order to compute the validity bit (e.g., collision bit) without having to decrypt the encrypted data in order to determine the underlying device data or user data.

In some implementations, the collision detection technique can accurately compute both the reach value and the frequency value. When two sketches are merged, the system can merge the active registers in the sketches to determine the reach. The reach can be determined by calculating the total count of active registers. In some instances, when two registers collide, the collision detection technique enables the system to deduplicate overlapping registers. However, in order to accurately calculate frequency when the registers collide, the system can determine whether the colliding registers are storing information for two different user devices or from the same user device coming from different publishers. For example, when the colliding registers are associated with the same user devices, then the frequencies are combined. The updated frequency can be utilized when computing the total frequency distribution. Alternatively, when the colliding registers are associated with different user devices, then the validity bit is set as false, and the registers are dropped when computing the total frequency distribution. Additionally, the total frequency distributions can be structured so that the loss with dropping colliding registers is controlled, and the system has enough active registers to perform a frequency histogram estimation.

Referring generally to the Figures, according to various illustrative implementations, systems and methods are described that provide secure and differentially private techniques to compute the reach and frequency of multisets representing client device information.

Referring now to FIG. 1, illustrated is a block diagram of an example system 100 for determining reach (e.g., count) and frequency of client device identifiers in a distributed environment, in accordance with one or more implementations. The system 100 can generate a histogram of estimated reach and frequency of data using homomorphic encryption. The system 100 can include one or more data processing systems 105A-N (sometimes referred to as the "data processing system(s) 105"), one or more data providers 120A-N (sometimes referred to as the "data provider(s) 120"), and at least one network 110. The data providers 120 can each include one or more client identifiers 125A-N (sometimes referred to as the "client identifier(s) 125"), one or more attributes 127A-N (sometimes referred to as the "attribute(s) 127"), and one or more fingerprint value 129A-N (sometimes referred to as the "fingerprint(s) 129"). Each data processing system 105 can include at least one encryption key maintainer 130, at least one data structure communicator 135, at least one data record hasher 140, at least one data structure combiner 145, at least one encryption engine 150, and at least one histogram generator 160.

Figure 5:
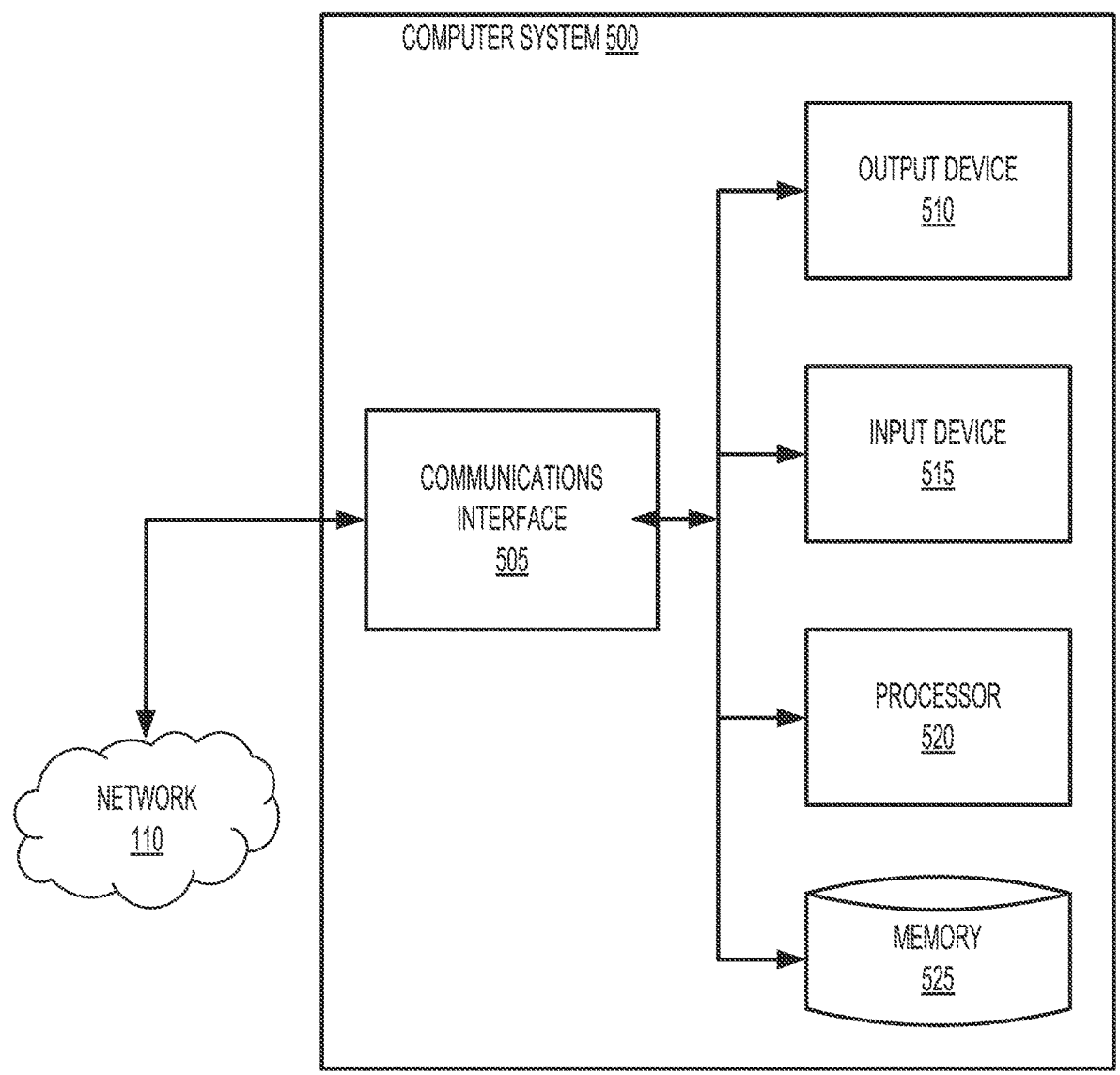
FIG. 5 illustrates the general architecture of an illustrative computer system that may be employed to implement any of the computers discussed herein.

Each of the components (e.g., the data processing systems 105, the data providers 120, the network 110) of the system 100 can be implemented using the hardware components or a combination of software with the hardware components of a computing system, such as the computing system 500 detailed herein in conjunction with FIG. 5. Each of the components of the data processing system 105 (e.g., the encryption key maintainer 130, the data structure communicator 135, the data record hasher 140, the data structure combiner 145, the encryption engine 150, the histogram generator 160) can perform any of the functionalities detailed herein.

Each of the data processing systems 105 can include at least one processor and at least one memory or other computer-readable storage medium, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of the computer system 500 described herein in conjunction with FIG. 5. In various implementations, the data processing systems 105 may be individual computing devices or servers, distributed computing platforms utilizing multiple computing devices operating in concert to perform tasks, cloud computing platforms, or any other type of computing devices/processing circuits.

The network 110 can include computer networks such as the Internet local, wide, metro or other area networks, intranets, satellite networks, other computer networks such as voice or data mobile phone communication networks, and combinations thereof. The data processing system 105 of the system 100 can communicate via the network 110, for instance with at least one data provider 120. The network 110 may be any form of computer network that can relay information between the data processing system 120A, data processing systems 120B-120N, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches) that are configured to receive and/or transmit data within the network 110. The network 110 may further include any number of hardwired and/or wireless connections. Any or all of the computing devices described herein (e.g., the data processing system 105, the data provider 120, the computer system 500) may communicate wirelessly (e.g., via Wi-Fi, cellular, radio) with a transceiver that is hardwired (e.g., via a fiber optic cable, a CAT5 cable) to other computing devices in the network 110. Any or all of the computing devices described herein (e.g., the data processing system 105, the data provider 120, the computer system 500) may also communicate wirelessly with the computing devices of the network 110 via a proxy device (e.g., a router, network switch, or gateway).

Each of the data providers 120 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), or combinations thereof. The memory may include, but is not limited to, electronic, optical, magnetic, or any other storage or transmission device capable of providing the processor with program instructions. The memory may further include a floppy disk, CD-ROM. DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of the computer system 500 described herein in conjunction with FIG. 5.

The client identifiers 125 can be maintained in the memory of each of the data providers 120. Alternatively, the client identifiers 125 can be maintained in a separate database (not pictured). In some implementations, the client identifiers 125 may not be communicated by each of the data providers 120, but duplicate client identifiers, each associated with corresponding attributes, may be present on different data providers 120. In some implementations, the client identifiers 125 exist as part of the same multiset across all of the data providers 120. A data provider 120 can be, for example, a content publisher that provides content to client devices (not pictured) via the network 110. The data provider 120 can measure one or more online activities, attributes (e.g., as the attributes 127), and identifiers (e.g., as the client identifiers 125) of the client devices to which the data provider 120 serves content.

A client identifier 125 can correspond to a respective one of the client devices to which a respective data provider 120 serves content. The attribute 127 can be stored in association with a respective client identifier 125 in the memory of the data provider 120 and include information about the attributes of the respective client device identified by the client identifier 125. The attributes 127 can include, for example, client device location data, client device metadata, client device parameters, settings, and other information, user profile data, interactions performed by the client device, application browsing history, web page browsing history, activity information, device characteristics, whether the client device has viewed or interacted with a particular item of content, whether a client device has performed a particular online activity, network utilization information, power utilization information, and device operating system version, settings, and other information, among others. The data provider 120 can receive a client identifier 125 and attribute data 127 from the client devices to which the data provider provides content. Certain attributes 127 associated with the same client identifier 125 may differ across different data providers 120. Said differently, each data provider 120 may maintain different attributes 127 for the same client identifier 125. In some instances, a fingerprint value 129 can include a client identifier 125, an attribute 127, information derived from a client identifier 125, or information derived from an attribute 127.

The data providers 120 can generate one or more sketches in response to an event, such as a request for a sketch. A sketch can be a data structure, such as an array, a list, or a vector, containing two or more tuples. To illustrate, a five-tuple is itself a data structure that represents a set of five values. For example, the five-tuple can be represented by the notation (value$_1$, value$_2$, value$_3$, value$_4$, value$_5$). It should be understood that N-tuples, including an arbitrary number of tuples, can be used to include multiple counter values that represent distributions different from the frequency distribution. Thus, as used herein, the terms "five-tuple" should be understood to apply to a tuple having any number of values to accommodate any number of counters for different distribution analysis.

The N-tuples can each have a position in the array, which can sometimes be referred to as a "register." Each register can be assigned a range of a continuous probability distribution. The count value can be a counter register that indicates the number of items assigned to that register. Empty registers have never been modified (e.g., no values assigned to that position in the sketch). Active registers are those where all items that have hashed to them have had the same fingerprint. An active register becomes inactive (but non-empty) when an item with a different fingerprint than all previous items hashes to it. This can occur, for example, in the event of a hash collision. Only the counts associated with active registers are valid for the purposes of frequency estimation.

In some implementations, the data providers 120 can generate fingerprint values 129 by using a fingerprint64bit (x) function. For example, the fingerprint function can generate a 64-bit random integer value. The fingerprint value 129 can provide a mapping from a client identifier 125 to a register of the sketch. Once the register identifier (e.g., the position in the array of five-tuples) is identified, the values of the five-tuples corresponding to that register identifier can be updated based on the fingerprint value 129 of the client identifier 125. Once the data provider 120 has generated the sketch with all of the client identifiers 125 having attributes 127 that match the attribute criteria in the request to generate a sketch, the data provider 120 can encrypt the sketch. To do so, the data provider 120 can iterate through each of the registers and create a new set of five-tuples. Each register can have an N-tuple form (e.g., count, fingerprint, register_id, R1, R2). The register_id can be the register identifier (e.g., position of the register in the sketch). The fingerprint can be the fingerprint value of the register sketch. The count can be the count value for the sketch. R1 and R2 can be distinct random numbers.

In some implementations, at least one of the data processing systems 105 can receive a request from an external computing device (not pictured) via the network 110 to perform the MPC to estimate the reach and the frequency of a client device identifiers 125 that match certain attribute criteria. When a data processing system 105 receives such a request, it can forward that request to the other data processing systems 105. Then, all of the data processing systems 105 can subsequently forward a request to generate a sketch to each of the data providers 120 that the data processing systems 105 correspond to. Finally, the data processing systems 105 can each receive sketches from the data providers 120, and the data processing systems 105 can perform the MPC estimation of the reach and the frequency using the data structures (e.g., the encrypted five-tuples) received from the data providers 120. The data processing systems 105 can communicate (e.g., via the network 110) with the data providers 120 and end customers as described in FIG. 2A-C.

In some implementations, the encryption key maintainer 130 can maintain, in the memory of the data processing system 105, a private decryption key corresponding to an aggregated public encryption key. The private decryption key and a public decryption key can be generated as an encryption key pair by the encryption key maintainer 130. For example, the encryption key maintainer 130 can choose a random integer X modulo q to generate a key. This can be the private key (sometimes referred to as the "decryption key" or "the secret key") used for decryption. Additionally, the public key can be generated as $G^X$. In some instances, the secret key X be distributed as shares using a secret sharing scheme. Each party (e.g., the data processing systems 105A-N) can compute a "public key share" using its share of the secret key, and the "true" public key can then be computed by combining the secret key shares in the exponent (note that combining shares is a linear operation, which can be done in the exponent using the group operation). Decryption shares can be computed by performing the decryption operation using the secret key shares and combining the result in the same manner as the public key was computed.

Additionally, the encryption key maintainer 130 can generate the public and private key shares of an encryption scheme, along with the other data processing systems 105 (e.g., acting as part of the configuration of workers 205 and the aggregator 210 depicted above in FIGS. 2A-2C), and distribute the public key shares to each of the other data processing systems 105, as described herein above in conjunction with FIG. 2A. The encryption key maintainer 130 can aggregate, or concatenate, the public key shares into a combined encryption key, and subsequently distribute the combined encryption key to each of the data providers 120 in communication with the respective data processing system 105 (e.g., as described herein above in conjunction with FIG. 2B).

The data structure communicator 135 can receive a sketch data structure including one or more tuples that are encrypted by the aggregated public encryption key (sometimes referred to herein as the "combined public encryption key"). The sketch data structure can be the shuffled and encrypted array of five-tuples transmitted by the data provider 120, as described herein above. Thus, each of the one or more encrypted tuples can include an encrypted count value, an encrypted fingerprint value, an encrypted register identifier value, an encrypted first random number, and an encrypted second random number. The data structure communicator 135 can receive the encrypted array of five-tuples in response to transmitting a request to a data provider 120, as described herein. Each five-tuple of the encrypted array of five-tuples can take the form of (E(register_id), E(count), E(fingerprint), E(first random number), E(second random number)), where encryption of a value Y is represented by E(Y). Given that the encryption scheme is performed using the aggregated or combined public key share, the data processing system 105 cannot entirely decode or decrypt the contents of any five-tuples in the array.

In some implementations, the data processor 105 can include a data record hasher 140. The data record hasher 140 can hash each of the data records maintained by the respective data processing system 105 to create a respective set of hashed data records. Applying the hash data records can include using the data record as an argument to a hash function. The data record hasher 140 can hash each of the data records using one or more hashes, thereby resulting in a number of hashed values that correspond to a respective one of the data records. As such, the data record hasher 140 can iterate over each of the data records in a loop and apply each of the hash functions to each data record as they are selected. After applying the hash functions, the data record hasher 140 can store each of the hashed data records in association with the respective data record in the memory of the respective data processing system 105A-N. The data record hasher 140 can further extract a register identifier from each of the hashed data records that correspond to each of the data records maintained by the respective data processing system 105A-N. Each of the hashed data records of the hashed data record set can correspond to a counter register. To identify the corresponding counter registers, the data record hasher 140 can extract a register identifier from each of the hashed data records.

Next, the data structure combiner 145 can combine each of the encrypted arrays of N-tuples (e.g., five-tuple) together into a single combined array of N-tuples. The array of N-tuples can include N-tuples from all of the data providers 120, including noise added by the data providers 120 prior to transmitting the tuples to a corresponding data processing system 105. In some implementations, the data processing system 105 designated as the aggregator can receive sketches from some of the data providers 120. In such implementations, the data processing system 105 designated as the aggregator can perform operations similar to those described above with respect to the data processing systems 105 that are designated as worker computing devices. Thus, the combined array of five-tuples can include all of the N-tuples received and generated by the data processing systems 105 that are participating in the MPC protocol. In some implementations, the data structure communicator 135 can transmit the combined array of N-tuples to a first worker computing device as depicted in FIG. 2A-C.

Referring back now to the functionality of a data processing system 105 designated as a worker computing device, the data structure communicator 135 can receive from the data processing system 105 designated as the aggregator computing device, a combined array of encrypted five-tuples. As described above, the combined array of encrypted five-tuples is differentially private and includes all of the encrypted five-tuples received by the data processing systems 105 from the data providers 120 and generated by the data processing systems 105 as noise values. If the data processing system 105 is not the first worker computing device, the data structure communicator 135 can receive the combined array of encrypted five-tuples from another data processing system 105 designated as a worker computing device, rather than designated as the aggregator computing device, in accordance with the ring configuration illustrated in FIG. 2C. The data processing system 105 can store the received combined array of encrypted three-tuples in the memory of the data processing system 105.

In some implementations, the encryption engine 150 can decrypt an encrypted value, and encrypt a value. For example, the count value and the fingerprint value can be encrypted using ElGamal encryption and can thus be summed in the ElGamal encryption domain using conventional techniques associated with additively homomorphic encryptions. Similar to the iterative decryption process, the encryption engine 150 can iterate through each of the encrypted tuples in the combined array and apply the key to each of the E(register_id), E(count), E(fingerprint), E(first random number), and E(second random number) in the five-tuple.

The data structure communicator 135 can then transmit the histogram generated by the histogram generator 160, along with the estimated reach value and estimated frequency value, to an external computing device via the network 110. In some implementations, the external computing device can transmit a request to the aggregator to perform the MPC protocol and determine a frequency histogram and an estimated reach and frequency values, as described herein above. The data structure communicator 135 can transmit the histogram and the estimated reach and frequency values in response to said request after the MPC protocol has been completed.

The histogram constructor 160 can construct a histogram based on the values of the encrypted combined data structure. For example, constructing the histogram can include decoding the encrypted combined data structure using a decoding lookup table appended or concatenated to the encrypted combined data structure. The decoding lookup table can be, for example, a corresponding decoding key created by at least one of the workers 205. The histogram constructor 160 can use the decoding lookup table to reveal the values of the aggregated vectors corresponding to the data providers 120. Once decrypted, the aggregated vector can include decrypted values that correspond to a target frequency value. The target frequency value can be provided by an internal configuration setting, provided in a request received from any of the computing devices in the system 100, or from one of the workers 205 or the aggregator 210.

Figure 2B:
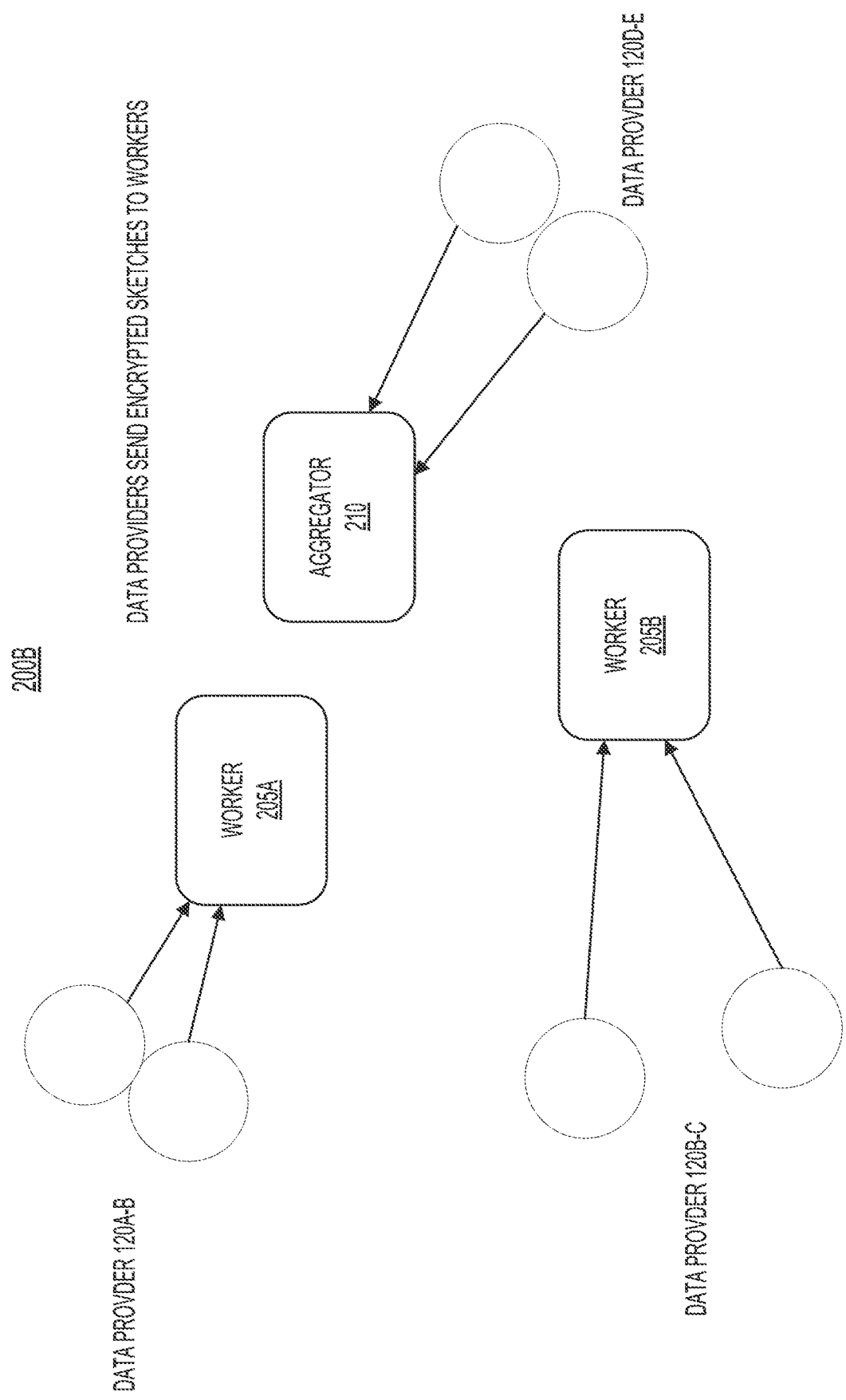
FIG. 2B depicts a block diagram of an example system for the generation of encrypted data structures, such as sketches, by data provider computing devices to the ring computing configuration depicted in FIG. 2A, in accordance with one or more implementations.
Figure 2C:
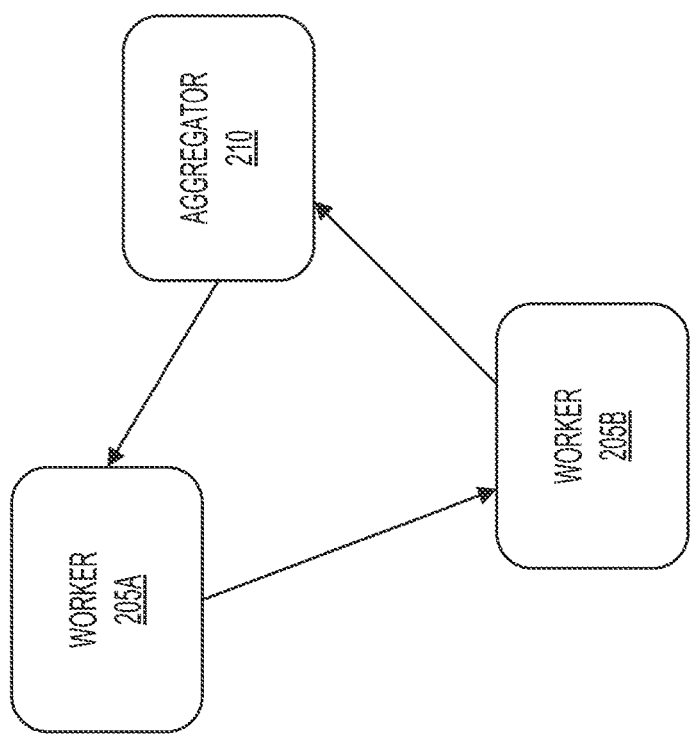
FIG. 2C depicts a block diagram of an example system showing a ring communication between worker computing devices and an aggregator computing device, in accordance with one or more implementations.

Referring now to FIGS. 2A-C, depicted is an example system 200A-C showing configurations of worker computing devices 205A and 205B with an aggregator computing device 210 as described herein. In some implementations, the systems (e.g., data processing system 105, data provider 120, external computing device) can carry out the MPC protocols described herein using the techniques described in FIGS. 2A-C. For example, a configuration of the data processing systems 105 and how they communicate with one another via the network 110 is described using the techniques described in FIGS. 2A-C.

It should be understood that the term "worker computing device" can refer to the data processing system 105 (e.g., any particular implementation of the data processing system 105, including the data processing system 105A, the data processing system 105B). Furthermore, it should be understood that the term "aggregator computing device" can refer to the data processing system 105 (e.g., any particular implementation of the data processing system 105, including the data processing system 105A, the data processing system 105B). The data processing system 105 can perform any of the functionalities of the worker computing devices 205A-B (sometimes generally referred to as "worker computing device(s) 205" or "worker(s) 205"), or the aggregator computing system 210 (sometimes generally referred to as the "aggregator 210"). Although only two workers 205 with one aggregator 210 are depicted in FIGS. 2A-C, it should be understood that any number of workers 205 can be present in the system 200A-C. Further, the aggregator 210 can perform all of the functionality of any of the workers 205, and the workers 205 can perform any of the functionality of the aggregator 210.

Referring now to FIG. 2A, depicted is a block diagram of an example system 200A for the generation and distribution of encryption keys. The MPC protocol depends in part on each of the workers 205 generating an encryption key pair, which can include a private decryption key and a public encryption key. The term "private" can refer to an encryption key or a decryption key that is specific to the computing device that generates that key, and indicates that said private key is not shared, or otherwise known, by any other party. The term "public" can refer to an encryption key or a decryption key that is known to computing devices other than the computing device that generated the encryption key. In a setup process to the MPC protocol, each of the workers 205 and the aggregator 210 can generate a private decryption key and a corresponding public encryption key. Each of the workers 205 and the aggregator 210 can communicate (e.g., via the network 110) their public encryption keys to one another, such that each worker 205 and the aggregator 210 can have a complete set of public encryption keys generated by all workers 205 and the aggregator 210 in the system 200A. Each worker 205 and the aggregator 210 can merge the encryption keys (e.g., combine, concatenate, store in a list data structure, append) the encryption keys together to form a composite key. The composite key can be stored in the memory of each worker 205 and the aggregator 210.

Referring now to FIG. 2B, depicted are various data providers 120 that are in communication (e.g., via the network 110) with corresponding workers 205 and the aggregator 210 in the system 200B. Although only two data providers 120 are shown in communication with each worker 205 and with the aggregator 210, it should be understood that any number of data providers 120 can be in communication with a corresponding worker 205 or a corresponding aggregator 210. As described herein above, each data provider 120 can provide one or more sketches to a corresponding worker 205 (or aggregator 210). Generally, each data provider 120 can communicate one or more sketches (sometimes referred to as "data structures", "probabilistic data structures", or similar terms) to a respective one of the workers 205 or the aggregator 210. Put another way, each data provider 120 can provide one or more sketches to one of the computing devices that participate in the MPC protocol for reach and frequency estimation. Each worker 205 (or aggregator 210) can store the received sketches in one or more data structures in the memory of the respective computing device and perform the MPC protocol as described herein.

Referring now to FIG. 2C, depicted is an example ring configuration, where each of the workers 205 and the aggregator 210 can perform computational tasks on the data structures subject to the MPC protocol, and subsequently forward said processed data structures to the next worker 205 (or the aggregator 210, as the case may be) in the system 200C. As described herein, the workers 205 and the aggregator 210 can communicate with one another via the network 110. In the description that follows, when a component of a data processing system 105 transmits a data structure (a sketch, matrix, vector, or any other type of data structure) to "the next worker device in the ring configuration." or similar language, it should be understood that the data processing system 105 can transmit one or more sketches or data structures to another data processing system 105 acting as another worker 205 in a ring configuration similar to that depicted in FIG. 2C. It should also be understood that while the functionality of the aggregator 210 can be performed by any of the workers 205, that during an iteration of the MPC protocol a single computing device is designated as the aggregator 210 and remains the aggregator 210 until the protocol is complete. In some implementations, this is decided prior to the protocol initiation, for example as part of the public key distribution step depicted in FIG. 2A.

Balancing Uniqueness Detector

Techniques for uniqueness detection in the MPC protocol for reach using the DPF evaluation are described herein. The technique enables the system to scale fingerprints by a first set of random numbers (to form first products) and by a second set of random numbers (to form second products). Due to the randomness of the numbers, if the fingerprints are equal, the mean of the first products should equal the mean of the second products. For example, a collision during the merging operation may not have occurred if the fingerprints are equal.

The techniques can utilize additively homomorphic encryption and are able to perform the reach and frequency estimations without revealing any private information regarding the client identifiers and client attributes.

In some implementations, the uniqueness detector can be a quadruple of $Z_n$ (modulo integers) ($W_\ell$, $S_\ell$, $W_\mathcal{R}$, $S_\mathcal{R}$). These elements can be referred to as weight left, scale left, weight right, scale right. The integers are encrypted and are additively homomorphic.

In some implementations, an empty register is mapped into (0, 0, 0, 0) tuple.

In some implementations, a register with an item x is mapped into (h (x)·$R_l$, $R_l$, h(x)·$R_r$, $R_r$) where h is a hash function and $R_l$ and $R_r$ and are random numbers. Multiplications can be easy because h(x), $R_l$, $R_r$ are known. The intuitive interpretation can be that h(x) is a weight of item x. The system is adding the weight $R_l$ times on the left scale and $R_r$ times on the right scale.

In some implementations, aggregation occurs by summing components of the quadruples, where quadruple ($w_l$, $s_l$, $w_r$, $s_r$) is:

$$w_l = \sum_i h(xi) \cdot R_{li}, \; s_l = \sum_i R_{li}, \; w_r = \sum_i h(xi) \cdot R_{ri}, \; s_r = \sum_i R_{ri}$$

In some implementations, average weight of items added to the left scale is equal to $w_l/s_l$ and average weight added to the right scale is equal to $w_r/s_r$. When all of the items are the same, then average weight on the left is equal to the average weight on the right. Alternatively, when all of the items are not the same then with high probability average weights of left and right scales would differ.

In some implementations, the system can also avoid division. To check whether all of the items added to the detector are the same, the system compute values:

$$\omega_l = w_l \cdot s_r, \; \omega_r = w_r \cdot s_l$$

Subsequently, the system can conclude that all of the items are the same if $\omega_l = \omega_r$. Alternatively, when $\omega_l$ is not equal $\omega_r$, then the system can conclude that all of the items are not the same.

As illustrated by this implementation, the technique described herein can be turned to an MPC with two first order multiplications. The technique can check equality without revealing the value without leaking any information.

MPC Protocol for Reach and Frequency Using DPF Evaluation

In some implementations, the function secret sharing, such as the Distributed Point Function (DPF), can be primitively defined by two algorithms, given a function f(x): X→Y.

The first algorithm can be GenKey(f) which outputs two keys $K_0$ and $K_1$.

The first algorithm can be Eval($K_b$, x) which outputs value $z_b$ for b=0, 1 and all x∈X such that $z_0$ and $z_1$ are two random shares of f(x) in $Z_p$ (i.e., $z_0+z_1$=f(x) mod p).

Additionally, a point function $f_{a,b}(x)$: X→Y can be a function such that f(a)=b and f(x)=0 for all x≠a.

The DPF can be a function secret sharing for a point function $f_{a,b}(x)$. For example, DPF constructions can exist such that the size of the DPF keys $K_0$ and $K_1$ is logarithmic in the function input domain |X| and output domain |Y|.

Data Sketch

In some implementations, a data sketch can consist of a number of registers where each register is a tuple (count, Fingerprint, validity bit). The count can be the number of items assigned to the register identifier (e.g., register_ID). The fingerprint can be a fingerprint of the inserted values. The validity bit can denote whether the output of this register is valid and should be used. For example, the validity bit is set if and only if the register has inserted items and all inserted items have the same fingerprint.

Protocol for Reach and Frequency

In a setup phase, two non-colluding computation servers S0 and S1, clients contributing their inputs of the form register_ID, count, and fingerprint.

As part of the client input contribution, a client can have an input a, count c, a fingerprint f, and a register_ID where the count and the fingerprint should be contributed to.

Additionally, the client generates random numbers r, q. Moreover, the system can compute DPF keys $K_0$ and $K_1$ such that $\text{Eval}(K_0, \text{register\_ID}) + \text{Eval}(K_1, \text{register\_ID}) = (c, r*f, r, q*f, q)$. Subsequently, the system can send the two DPF keys $K_0$ and $K_1$ to $S_0$ and $S_1$ respectively.

As part of the server expansion and aggregation, the server can expand the keys received from all clients and sum the resulting vectors:

For example, For all register_ID:
a. $S_0$ computes $V_{0,register\_ID} = \Sigma_{all\ clients\ j} \text{Eval}(K^i_0, \text{register\_ID})$. This is a 5-dimension vector where the components are shares of:
 i. $\Sigma_{all\ clients\ i}\ C_i$
 ii. $\Sigma_{all\ clients\ i}\ (r_i * f_i)$
 iii. $\Sigma_{all\ clients\ i}\ r_i$
 iv. $\Sigma_{all\ clients\ i}\ (q_i * f_i)$
 v. $\Sigma_{all\ clients\ i}\ q_i$
b. $S_1$ computes $V_{1,register\_ID} = \Sigma_{all\ clients\ i} \text{Eval}(K^i_1, \text{register\_ID})$. This is a 5-dimension vector where the components are shares of:
c. dimension vector where the components are shares of:
 i. $\Sigma_{all\ clients\ i}\ c_i$
 ii. $\Sigma_{all\ clients\ i}\ (r_i * f_i)$
 iii. $\Sigma_{all\ clients\ i}\ r_i$
 iv. $\Sigma_{all\ clients\ i}\ (q_i * f_i)$
 v. $\Sigma_{all\ clients\ i}\ q_i$ As part of the computation of validity bits and output, the system can perform the following operations:

For each register_ID $S_0$ and $S_1$ run a two-party computation protocol for the following functionality: check whether the following is equal to 0.

$$(V_{register\_ID}[1] * V_{register\_ID}[4]) - (V_{register\_ID}[3] * V_{register\_ID}[3]) = \left(\sum_{all\ clients\ i} (r_i * f_i)\right) * \left(\sum_{all\ clients\ i} q_i\right) - \left(\sum_{all\ clients\ i} (q_i * f_i)\right) * \left(\sum_{all\ clients\ i} r_i\right) \qquad \text{Equation (1)}$$

Lemma 1 argues that equation (1) is equal to 0 with overwhelming probability if and only if all $f_i$ value are the same. $S_0$ and $S_1$ can run an MPC to compute the two multiplications and subtract their shares.

If equation 1 is equal to 0, $S_0$ and $S_1$ to learn the empty registers, then the system can use the following protocol:
a. $S_0$ sends $V_{0,register\_ID}[4]$ and $V_{0,register\_ID}[2]$ to $S_1$
b. S1 sends $V_{0,register\_ID}[4]$ and $V_{0,register\_ID}[2]$ to $S_2$
c. $S_0$ and $S_1$ reconstruct $R = \Sigma_{all\ clients\ i}\ r_i$ and $Q = \Sigma_{all\ clients\ i}\ q_i$
d. $S_0$ computes $A_0 = R * V_{0,register\_ID}[3] - Q * V_{0,register\_ID}[1]$
e. $S_1$ computes $A_1 = R * V_{1,register\_ID}[3] - Q * V_{1,register\_ID}[1]$ For each register_ID:
a. $S_0$ computes $V_{0,register\_ID}[1] + \frac{1}{2}$ DP noise and sends it to the output receiver together with $A_0$.
b. S1 computes $V_{1,register\_ID}[1] + \frac{1}{2}$ DP noise and sends it to the output receiver together with $A_1$.

If either party has added non-zero noise to the count it also perturbs its share $A_0$ or $A_1$ of the validity bit by adding a random value (e.g., for buckets where the system adds noise, the system can count them as "destroyed"). The two servers send the two resulting shares $d_0$ and $d_1$ to the output receiver. In some instances, in order to keep registers with noise as active, then the two servers skip the last step.

Additionally, for a differential privacy (DP) system, the system can also offer an option where the servers insert non-real registers instead of adding central noise as above if that is necessary. The system can also locally emulate at each server the addition of non-real records by updating the counts in the corresponding locations.

AS part of the output reconstruction, the output receiver can compute:
a. $A_0 + A_1$ and checks whether it is equal to 0
b. $V_{0,register\_ID}[0] + \frac{1}{2}$ DP noise $+ V_{1,register\_ID}[0] + \frac{1}{2}$ DP noise to obtain count+central DP noise for register_ID.

Multiple Sketches

The protocols described herein can be used to union multiple sketches by adding their corresponding vectors and running the protocol for the computation of the validity bits.

As part of the inputs, each party $P_i$ can have a sketch that represents its own reach and frequency.

As part of the outputs, the system can have a sketch across the data of all parties $P_i$.

As part of the setting, the system can have k workers $W_i$ that do the computation that can be instantiated by the parties $P_i$.

As part of the protocol, for each party $P_i$ can compute a sketch of its data:
a. Generate an empty array of size the number of register IDs where each location has five integers.
b. For each record (register_ID, c, f) generate random numbers r and q and add (count, r*f, r, q*f, q) to the values in location register_ID in the above array.

Continuing with the protocol, each party $P_i$ can share with arithmetic shares its sketch computes above. For each register_ID is computes $(w_c^j, w_{fr}^j, w_r^j, w_{fq}^j, w_q^j)$ where:
a. $\Sigma_{j=1\ to\ k}\ w_c^j$ is the total count in register_ID;
b. $\Sigma_{j=1\ to\ k}\ W_{fr}^j$ is the total sum for the fingerprints for register_ID;
c. $\Sigma_{j=1\ to\ k}\ W_r^j$ is the total sum for the random values for register_ID;
d. $\Sigma_{j=1\ to\ k}\ W_{fq}^j$ is the total sum for the fingerprints for register_ID;
e. $\Sigma_{j=1\ to\ k}\ W_q^j$ is the total sum for the random values for register_ID;

Continuing with the protocol, each worker $W_j$ can sum up all the sketch shares it received. For example, for each register_ID it computes:

a. $C_j = \sum_{all\ clients} w_c^j$ b. $FR_j = \sum_{all\ clients} w_{fr}^j$ c. $R_j = \sum_{all\ clients} w_r^j$ d. $FQ_j = \sum_{all\ clients} w_{fq}^j$ e. $Q_j = \sum_{all\ clients} w_q^j$ Continuing with the protocol, for each register_ID the worker $W_j$ run a protocol to compute shares $A_j$ of the value $(\Sigma_{all\ clients}\ w_{fr}^j) * (\Sigma_{all\ clients}\ w_q^j) - (\Sigma_{all\ clients}\ w_{fq}^j) * (\Sigma_{all\ clients}\ w_r^j)$ Continuing with the protocol, each worker $W_j$ sends to the output receiver a. $C_1^{'} = C_j + 1/k\ DP$ noise b. $A'_j$ perturbed with a random number if the noise in the previous step is different from 0

Continuing with the protocol, the output receiver computes:

a. $\Sigma_{j=1 \ to \ k} A'_j$ and check that it equals 0
b. $\Sigma_{j=1 \ to \ k} C'_j$ to obtain the DP count for the register In some instances, when supporting inputs are sketches shared between two helpers: If the input of a party is held shared by two helpers as in the protocol of the previous section, the helpers can compute shares from their sketch share for all workers. Then, the protocol proceeds exactly in the same way.

Security Properties

The protocols described herein do not reveal any private data to the computation parties. The technique is an example for uniqueness detection in reach MPC with DPF. The technique is able to work based on additively homomorphic encryption and without revealing extra information because empty registers can be merged. For example, an empty register can be mapped into (0,0,0,0,0) tuple. The techniques described herein can be turned to an MPC with two first order multiplications. The system can check whether there is a collision without revealing the value, thus no information is leaked.

Another Version of MPC Protocol for Reach and Frequency Using DPF Evaluation

In some implementations, another version of a protocol for reach and frequency can be utilized with different trade-offs.

As part of the setup, the system can include two non-colluding computation servers $S_0$ and $S_1$. The clients can contribute their inputs of the form register_ID, count, fingerprint.

The system can use DPF construction where shares are computed over modulo $2^n$. Thus, if the system shares a value $x\|y$ of n bits where y has k<n bits into shares $w_0=x_0\|y_0$ and $w_1=x_0\|y_0$ where $y_0$ and $y_1$ have k bits, i.e., $w_0+w_1=x\|y$ mod $2^n$, then $y_0+y_1$ end with k bits equal to y.

Additionally, $w_0+w_1=2^{k}*x+y$ mod $2^n=2^k*(x_0+x_1)+y_0+y_1$ mod $2^n=2^k*(x_0+x_1 \ mod \ 2^{n-k})+y_0+y_1$, hence $y=y_0+y_1$ mod $2^k$.

As part of the client input contribution, the client generates a random number r. Additionally, the system compute DPF keys $K_0$ and $K_1$ such that $Eval(K_0, register\_ID)+Eval(K_1, register\_ID)=(count, r*(fingerprint|Hash(register\_ID)), r)$. Furthermore, the system sends the two DPF keys $K_0$ and $K_1$ to $S_0$ and $S_1$ respectively.

As part of the server expansion and aggregation, the server expand the keys received from all clients and sum the resulting vectors:

a. For all register_ID
  i. $S_0$ computes $V_{0,register\_ID}=\Sigma_{all \ clients \ i} Eval(K_i^0, register\_ID)$. This is a dimension 3 vector where the components are shares of
     1. $\Sigma_{all \ clients \ i} count_i$
     2. $\Sigma_{all \ clients \ i} (r_i*fingerprint_i)$
     3. $\Sigma_{all \ clients \ i} r_i$
  ii. S1 computes $V_{1,register\_ID}=\Sigma_{all \ clients \ i} Eval(K_i^1, register\_ID)$. This is a dimension 3 vector where the components are shares of
     1. $\Sigma_{all \ clients \ i} count_i$
     2. $\Sigma_{all \ clients \ i} (r_i*fingerprint_i)$
     3. $\Sigma_{all \ clients \ i} r_i$ As part of the computation of validity bits and output, the following operations can be performed:

a. For each register_ID $S_0$ and $S_1$, the system runs a two-party computation protocol for the following functionality: recover $V_{register\_ID}[2]$, which is the linear combination of the contribution bits for clients using $R_i$ coefficients, and $V_{register\_ID}[1]$, which is the linear combination of all fingerprints using $R_i$ coefficients. The servers check that $V_{register\_ID}[1]/V_{register\_ID}[2]$ ends with Hash(register_ID).
  i. $S_0$ and $S_1$ run two party computation to obtain shares $A_0$ and $A_1$ of the value computes $A_1=(V_{0,register\_ID}[1]+V_{1,register\_ID}[1])/(V_{0,register\_ID}[2]+V_{1,register\_ID}[2])-Hash(register\_ID)$. Let $A'_0$ and $A'_1$ be the last |Hash(register_ID)| bits of $A_0$ and $A_1$.
  ii. Note: If $A_0+A_1$ mod p ends in as many 0's as the length of Hash(register_ID), then all inserted items have the same fingerprint with all but negligible probability. The value $A_0+A_1$ mod p is 0 if the count is 0 (i.e., the sum of fingerprints is 0)
b. For each register_ID
  i. $S_0$ computes $V_{0,register\_ID}[1]+½$ DP noise and sends it to the output receiver together with $A'_0$.
  ii. S1 computes $V_{1,register\_ID}[1]+½$ DP noise and sends it to the output receiver together with $A'_1$.
c. If either party has added non-zero noise to the count it also perturbs its share $A'_0$ or $A'_1$ of the validity bit by adding a random value (i.e., for buckets where the system adds noise, the system counts them as "destroyed"). The two servers can send the two resulting shares d0 and d1 to the output receiver.
d. Note: If the system wants to keep registers with noise as active, then the two servers skip the last step described above.
e. Note: for DP, the system can also offer an option where the servers inserts dummy registers instead of adding central noise as above if that is necessary As part of the output reconstruction, the output receiver can compute:

a. $A'_0+A'_1$ and checks whether it ends with |Hash(register_ID)|0 bits to obtain the validity bit
b. $V_{0,register\_ID}[0]+½$ DP noise+$V_{1,register\_ID}[0]+½$ DP noise to obtain count+central DP noise for register_ID.

Example Methods

Figure 3:
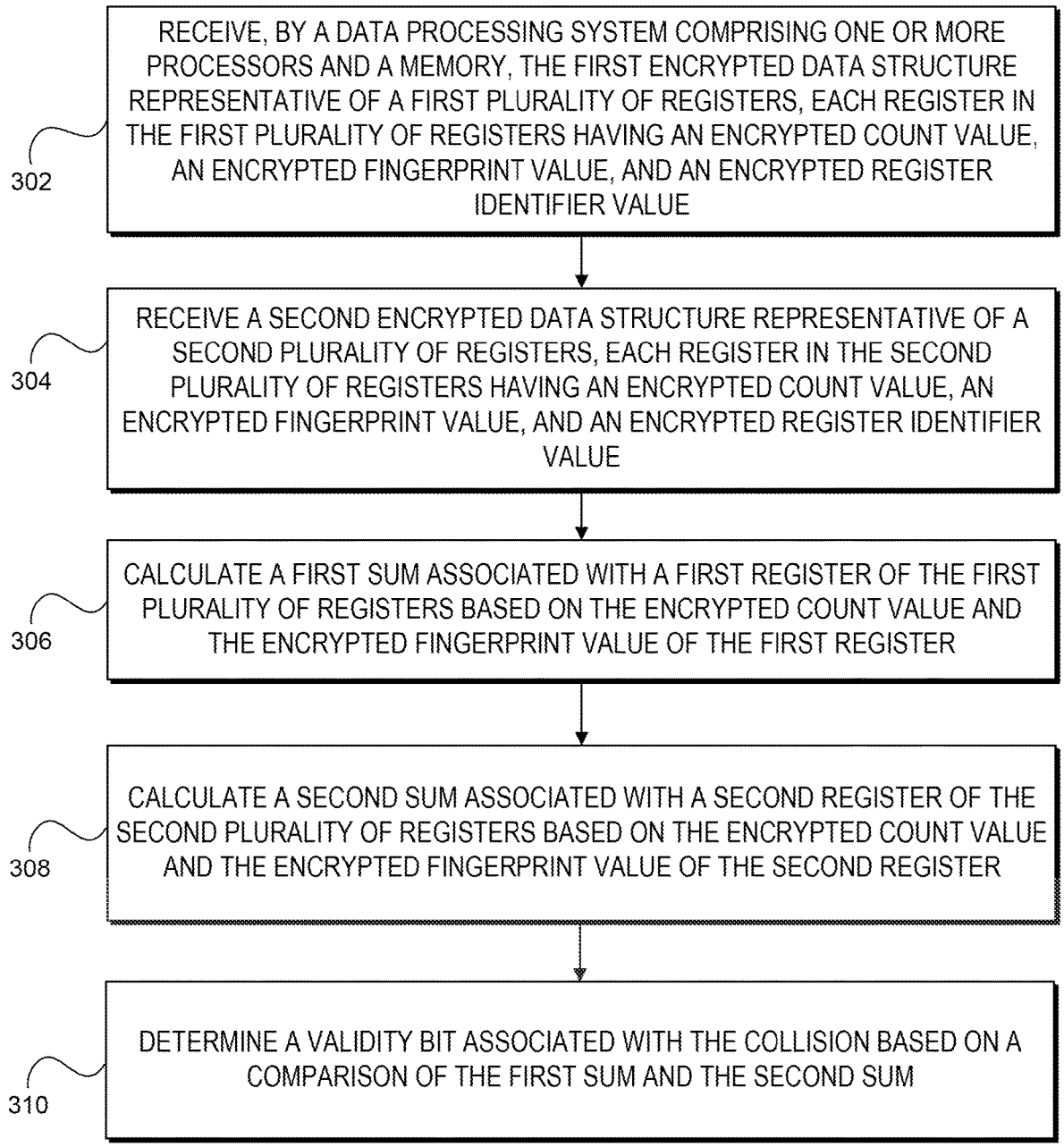
FIG. 3 depicts a flow chart diagram of an example method for detecting a collision when combining a first encrypted data structure and a second encrypted data structure into a combined encrypted data structure according to example embodiments of the present disclosure.

FIG. 3 depicts a flow chart diagram of an example method for detecting a collision when combining a first encrypted data structure and a second encrypted data structure into a combined encrypted data structure according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At 302, a system (e.g., data processing system 105, computer system 500) can receive a first encrypted data structure representative of a first plurality of registers. For example, the system can be the data processing system 105 in FIG. 1 having one or more processors and a memory. Each register in the first plurality of registers can have an encrypted fingerprint value, and an encrypted register identifier value. In some implementations, each register in the first plurality of registers can have an encrypted count value.

In some implementations, each register in the first plurality of registers is a five-tuple. The five-tuple can contain the registration identifier, a count value, a fingerprint value, a first random number, and a second random number. Additionally, each five-tuple of the encrypted array of five-tuples can take the form of (E(register_id), E(count), E(fingerprint), E(first random number), E(second random number)), where encryption of a value Y is represented by E(Y).

In some implementations, the encrypted count value of the first register corresponds to a number of advertisement views associated with the encrypted fingerprint value.

In some implementations, the first set of identifiers is received from a first publishing computing device (e.g., data provider 120A), and wherein the second set of identifiers is received from a second publishing computing device (e.g., data provider 120B).

In some implementations, the first encrypted data structure is transmitted, by a data provider 120 to a data processing system 105, using a dense protocol. In the dense protocol, the data structure includes an empty register. For example, the encrypted fingerprint value prior to being encrypted is indicative of a zero value for one or more registers in the first plurality of registers.

At 304, the system can receive a second encrypted data structure representative of a second plurality of registers. Each register in the second plurality of registers can have an encrypted fingerprint value, and an encrypted register identifier value. In some implementations, each register in the second plurality of registers can have an encrypted count value.

In some implementations, the encrypted register identifier value of the first register is equal to the encrypted register identifier value of the second register. For example, the system can check that the encrypted register identifier value of the first register is equal to the encrypted register identifier value of the second register prior to performing the merge operation.

At 306, the system can calculate a first sum associated with a first register of the first plurality of registers based on the encrypted fingerprint value of the first register. In some implementations, the system can calculate the first sum based on the encrypted count value of the first register and the encrypted fingerprint value of the first register. For example, the first register can be a five-tuple array that is encrypted, and the plurality of vectors described in method 400 can be a five-dimensional vector. The five-tuple associated with the first register can contain the registration identifier, a count value, a fingerprint value, a first random number, and a second random number. Additionally, each five-tuple of the encrypted array of five-tuples can take the form of (E(register_id). E(count), E(fingerprint), E(first random number), E(second random number)), where encryption of a value Y is represented by E(Y).

In some implementations, the first encrypted data structure has an additively homomorphic encryption. Additionally, the system can calculate the first sum without having to decrypt the encrypted count value of the first register and without having to decrypt the encrypted fingerprint value of the first register.

At 308, the system can calculate a second sum associated with a second register of the second plurality of registers based on the encrypted fingerprint value of the second register. In some implementations, the system can calculate the second sum based on the encrypted count value of the second register and the encrypted fingerprint value of the second register. For example, the second register can be a five-tuple array that is encrypted. The five-tuple associated with the second register can contain the registration identifier, a count value, a fingerprint value, a first random number, and a second random number. Additionally, each five-tuple of the encrypted array of five-tuples can take the form of (E(register_id), E(count), E(fingerprint), E(first random number). E(second random number)), where encryption of a value Y is represented by E(Y).

In some implementations, the second encrypted data structure has an additively homomorphic encryption. Additionally, the system can calculate the second sum without having to decrypt the encrypted count value of the second register and without having to decrypt the encrypted fingerprint value of the second register.

In some implementations, the first register can include an encrypted first count value and the second register includes an encrypted second count value. Additionally, the first sum can be further calculated based on the encrypted first count value. Moreover, the second sum can be further calculated based on the encrypted second count value.

At 310, the system can determine a validity bit associated with a collision based on a comparison of the first sum and the second sum. For example, the collision can occur between the first register and the second register when combining the first encrypted data structure and the second encrypted data structure into a combined encrypted data structure.

In some implementations, method 300 further includes the system generating a third register in the combined encrypted data structure by concatenating the first register and the second register when the validity bit is set as true. Additionally, the system can calculate reach value associated with the third register based on a summation of the encrypted first count value and the encrypted second count value.

In some implementations, method 300 further includes the system generating the combined encrypted data structure by concatenating the first encrypted data structure with the second encrypted data structure. The combined encrypted data structure can be representative of a third plurality of registers. Each register in the third plurality of registers can have an encrypted count value, an encrypted fingerprint value, an encrypted register identifier value, and a validity bit. In some instances, the validity bit can be encrypted. For example, a third register in the third plurality of registers can have an encrypted count value, an encrypted fingerprint value, an encrypted register identifier value, and the validity bit.

In some implementations, the validity bit is encrypted by the data processing system prior to being transmitted to a worker computing device.

In some implementations, method 300 further include the system transmitting, by the data processing system, the combined encrypted data structure to a worker computing device, each register in the third plurality of registers having an encrypted count value, an encrypted fingerprint value, an encrypted register identifier value, and an encrypted validity bit.

In some implementations, the validity bit can be set as true when the encrypted fingerprint value of the first register matches the encrypted fingerprint value of the second register.

In some implementations, the validity bit can be set as true when the encrypted fingerprint value of the first register or the encrypted fingerprint value of the second register when decrypted is equal zero.

In some implementations, the validity bit can be set as false when the encrypted fingerprint value of the first register does not matches the encrypted fingerprint value of the second register, and neither the encrypted fingerprint value of the first register nor the encrypted fingerprint value of the second register when decrypted is indicative of a zero value.

Figure 4:
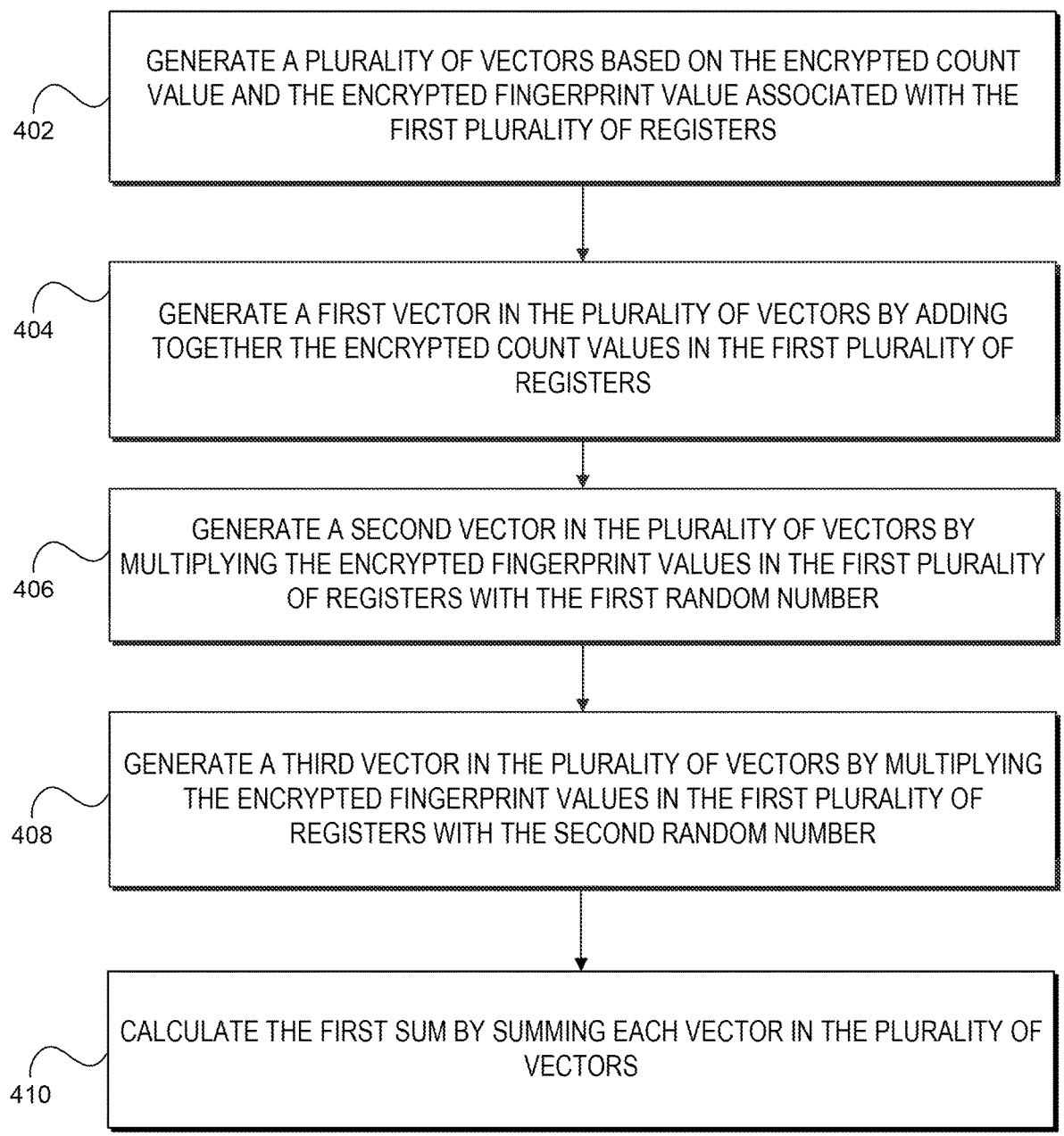
FIG. 4 depicts a flow chart diagram of an example method for calculating a first sum associated with the first encrypted data structure according to example embodiments of the present disclosure.

FIG. 4 depicts a flow chart diagram of an example method for calculating a first sum associated with the first encrypted data structure according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

Method 400 enables the system to perform a collision detection technique even when one or more of the registers in the first encrypted data structure or the second encrypted data structure are empty. As previously discussed, conventional collision detection methods were unable to accurately detect a collision when one of the merging registers were empty, and as a result the merge operation could only be performed with a sparse protocol (i.e., merging of only non-empty registers).

In some implementations, the operations described in method 400 can be performed when calculating the first sum at 306 or the second sum at 308 in method 300.

At 402, the system can generate a plurality of vectors based on the encrypted count value and the encrypted fingerprint value associated with the first plurality of registers.

At 404, the system can generate a first vector in the plurality of vectors by adding together the encrypted count values in the first plurality of registers.

In some implementations, the plurality of vectors can be further based on a first random number and a second random number.

At 406, the system can generate a second vector in the plurality of vectors by multiplying the encrypted fingerprint values in the first plurality of registers with the first random number.

At 408, the system can generate a third vector in the plurality of vectors by multiplying the encrypted fingerprint values in the first plurality of registers with the second random number.

At 410, the system can calculate the first sum by summing each vector (e.g., first vector, second vector, third vector) in the plurality of vectors.

In some implementations, the first register can be a four-tuple array that is encrypted, and the plurality of vectors can be a four-dimensional vector. An example embodiment of the four-tuple array is described in the Balancing Uniqueness Detector section of the disclosure.

In some implementations, the first register can be a five-tuple array that is encrypted, and the plurality of vectors can be a five-dimensional vector. An example embodiment of the four-tuple array is described in the Protocol for Reach and Frequency section of the disclosure.

FIG. 5 shows the general architecture of an illustrative computer system 500 that may be employed to implement any of the computer systems discussed herein in accordance with some implementations. The computer system 500 can be used to provide information via the network 110 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in any of the computing devices described herein.

In the computer system 500 of FIG. 5, the memory 525 may comprise any computer-readable storage media and may store computer instructions such as processor-executable instructions for implementing the various functionalities described herein for respective systems, as well as any data relating thereto, generated thereby, or received via the communications interface(s) or input device(s) (if present). Referring again to the system 500 of FIG. 5, the computer system 500 can include the memory 525 to store any of the information, variables, vectors, data structures, or other computer-readable information described herein, among others. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 5, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the computer system 500.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described: the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A method for detecting a collision in secure multi-party computation when combining a first encrypted data structure and a second encrypted data structure into a combined encrypted data structure, comprising:
   receiving, by a data processing system comprising one or more processors and a memory, the first encrypted data structure representative of a first plurality of registers, each register in the first plurality of registers having an encrypted fingerprint value, and an encrypted register identifier value;
   receiving, by the data processing system, the second encrypted data structure representative of a second plurality of registers, each register in the second plurality of registers having an encrypted fingerprint value, and an encrypted register identifier value;
   calculating, by the data processing system, a first sum associated with a first register of the first plurality of registers based on the encrypted fingerprint value of the first register;
   calculating, by the data processing system, a second sum associated with a second register of the second plurality of registers based on the encrypted fingerprint value of the second register; and
   determining, by the data processing system, a validity bit indicating whether the collision has occurred based on a comparison of the first sum and the second sum, wherein the validity bit is set as true when the encrypted fingerprint value of the first register or the encrypted fingerprint value of the second register when decrypted is indicative of a zero value.

2. The method of claim 1, wherein the first register includes an encrypted first count value and the second register includes an encrypted second count value, and wherein the first sum is further calculated based on the encrypted first count value, and wherein the second sum is further calculated based on the encrypted second count value.

3. The method of claim 2, the method further comprising:
   generating a third register in the combined encrypted data structure by concatenating the first register and the second register when the validity bit is set as true; and
   calculating a reach value associated with the third register based on a summation of the encrypted first count value and the encrypted second count value.

4. The method of claim 1, wherein the first encrypted data structure is transmitted using a dense protocol, and wherein the encrypted fingerprint value of the first register prior to being encrypted is indicative of a zero value for one or more registers in the first plurality of registers.

5. The method of claim 1, further comprising:
generating the combined encrypted data structure by concatenating the first encrypted data structure with the second encrypted data structure, the combined encrypted data structure representative of a third plurality of registers, a third register in the third plurality of registers having an encrypted count value, an encrypted fingerprint value, an encrypted register identifier value, and the validity bit.

6. The method of claim 5, wherein the validity bit is encrypted by the data processing system prior to being transmitted to a worker computing device.

7. The method of claim 6, further comprising:
transmitting, by the data processing system, the combined encrypted data structure to the worker computing device, each register in the third plurality of registers having an encrypted count value, an encrypted fingerprint value, an encrypted register identifier value, and an encrypted validity bit; and
wherein a reach value and a frequency value is calculated based on the encrypted count value and the encrypted validity bit.

8. The method of claim 1, wherein the validity bit is set as true when the encrypted fingerprint value of the first register matches the encrypted fingerprint value of the second register.

9. The method of claim 1, wherein the validity bit is set as false when the encrypted fingerprint value of the first register does not match the encrypted fingerprint value of the second register, and neither the encrypted fingerprint value of the first register nor the encrypted fingerprint value of the second register when decrypted is indicative of a zero value.

10. The method of claim 1, wherein the encrypted register identifier value of the first register is equal to the encrypted register identifier value of the second register.

11. The method of claim 1, wherein the first encrypted data structure has an additively homomorphic encryption, and wherein the data processing system calculates the first sum without having to decrypt the encrypted count value of the first register and the encrypted fingerprint value of the first register.

12. The method of claim 1, wherein the first plurality of registers is received from a first publishing computing device, and wherein the second plurality of registers is received from a second publishing computing device.

13. The method of claim 1, wherein calculating the first sum associated with the first register includes:
generating a plurality of vectors based on the encrypted count value and the encrypted fingerprint value associated with the first plurality of registers; and
wherein the first sum is calculated by summing each vector in the plurality of vectors.

14. The method of claim 13, wherein a first vector in the plurality of vectors is generated by adding together the encrypted count values in the first plurality of registers.

15. The method of claim 13, wherein the plurality of vectors is further based on a first random number and a second random number.

16. The method of claim 15, where a second vector in the plurality of vectors is generated by:
multiplying the encrypted fingerprint values in the first plurality of registers with the first random number.

17. The method of claim 15, where a third vector in the plurality of vectors is generated by:
multiplying the encrypted fingerprint values in the first plurality of registers with the second random number.

18. A computing device for detecting a collision in secure multi-party computation when combining a first encrypted data structure and a second encrypted data structure into a combined encrypted data structure, comprising:
one or more processors; and
one or more memory devices storing instructions that are executable by the one or more processors to cause the one or more processors to perform operations, the operations comprising:
receiving the first encrypted data structure representative of a first plurality of registers, each register in the first plurality of registers having an encrypted fingerprint value, and an encrypted register identifier value;
receiving the second encrypted data structure representative of a second plurality of registers, each register in the second plurality of registers having an encrypted fingerprint value, and an encrypted register identifier value;
calculating a first sum associated with a first register of the first plurality of registers based on the encrypted fingerprint value of the first register;
calculating a second sum associated with a second register of the second plurality of registers based on the encrypted fingerprint value of the second register; and
determining a validity bit indicating whether the collision has occurred based on a comparison of the first sum and the second sum, wherein the validity bit is set as true when the encrypted fingerprint value of the first register or the encrypted fingerprint value of the second register when decrypted is indicative of a zero value.

19. One or more non-transitory computer-readable media comprising instructions for detecting a collision in secure multi-party computation when combining a first encrypted data structure and a second encrypted data structure into a combined encrypted data structure, the instructions when executed by one or more computing devices, cause the one or more computing devices to perform operations comprising:
receiving the first encrypted data structure representative of a first plurality of registers, each register in the first plurality of registers having an encrypted fingerprint value, and an encrypted register identifier value;
receiving the second encrypted data structure representative of a second plurality of registers, each register in the second plurality of registers having an encrypted fingerprint value, and an encrypted register identifier value;
calculating a first sum associated with a first register of the first plurality of registers based on the encrypted fingerprint value of the first register;
calculating a second sum associated with a second register of the second plurality of registers based on the encrypted fingerprint value of the second register; and
determining a validity bit indicating whether the collision has occurred based on a comparison of the first sum and the second sum, wherein the validity bit is set as true when the encrypted fingerprint value of the first register or the encrypted fingerprint value of the second register when decrypted is indicative of a zero value.

* * * * *